US011242461B2

(12) United States Patent
Zha et al.

(10) Patent No.: US 11,242,461 B2
(45) Date of Patent: Feb. 8, 2022

(54) GREASE, OIL, AND WATER RESISTANT COATING COMPOSITIONS

(71) Applicant: SUN CHEMICAL CORPORATION, Parsippany, NJ (US)

(72) Inventors: Yongping Zha, Berkeley Heights, NJ (US); Vanessa Gordon, Montvale, NJ (US); Saverio Lucci, Clifton, NJ (US); Philippe Schottland, Sparta, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 359 days.

(21) Appl. No.: 16/341,741

(22) PCT Filed: Oct. 31, 2017

(86) PCT No.: PCT/US2017/059164
§ 371 (c)(1),
(2) Date: Apr. 12, 2019

(87) PCT Pub. No.: WO2018/081764
PCT Pub. Date: May 3, 2018

(65) Prior Publication Data
US 2020/0056052 A1 Feb. 20, 2020

Related U.S. Application Data

(60) Provisional application No. 62/414,838, filed on Oct. 31, 2016.

(51) Int. Cl.
*D21H 19/18* (2006.01)
*D21H 19/78* (2006.01)
*D21H 19/00* (2006.01)
*D21H 27/10* (2006.01)
*C09D 5/00* (2006.01)
*C09D 7/65* (2018.01)
*C09D 125/14* (2006.01)
*C09D 133/06* (2006.01)
*C09D 7/40* (2018.01)

(52) U.S. Cl.
CPC .............. *C09D 5/00* (2013.01); *C09D 7/65* (2018.01); *C09D 7/67* (2018.01); *C09D 7/68* (2018.01); *C09D 7/69* (2018.01); *C09D 125/14* (2013.01); *C09D 133/062* (2013.01)

(58) Field of Classification Search
None
See application file for complete search history.

(56) References Cited

U.S. PATENT DOCUMENTS

| | | | |
|---|---|---|---|
| 6,071,617 A | 6/2000 | Wissgott | |
| 6,307,192 B1 | 10/2001 | Ulfstedt et al. | |
| 7,019,054 B2 | 3/2006 | Dixit et al. | |
| 7,282,273 B2 | 10/2007 | Murphy et al. | |
| 7,320,825 B2 | 1/2008 | Morabito | |
| 7,427,444 B2 | 9/2008 | Rabasco et al. | |
| 7,737,200 B2 | 6/2010 | Jabar, Jr. et al. | |
| 8,440,262 B2 | 5/2013 | Dandenault et al. | |
| 8,734,895 B2 | 5/2014 | Propst, Jr. et al. | |
| 8,734,959 B2 | 5/2014 | Johansson et al. | |
| 8,758,567 B2 | 6/2014 | Brungardt | |
| 8,771,812 B2 | 7/2014 | Seyffer et al. | |
| 8,771,835 B2 | 7/2014 | Iyengar et al. | |
| 9,732,474 B2 | 8/2017 | Koenig | |
| 2003/0171481 A1* | 9/2003 | Toyoda | C09D 123/0815 524/502 |
| 2006/0292305 A1* | 12/2006 | Skuse | C09C 1/42 427/361 |
| 2007/0232743 A1 | 10/2007 | Laviolette | |
| 2009/0252980 A1 | 10/2009 | Berg et al. | |
| 2010/0136355 A1 | 6/2010 | Van Den Abbeele Henk | |
| 2011/0027601 A1 | 2/2011 | Ruffner, Jr. et al. | |
| 2011/0262745 A1 | 10/2011 | Ronka | |
| 2013/0004748 A1 | 1/2013 | Heiskanen et al. | |
| 2013/0323368 A1 | 12/2013 | Santos | |

(Continued)

FOREIGN PATENT DOCUMENTS

| | | |
|---|---|---|
| CA | 2323341 | 4/2001 |
| CL | 56623 | 11/2011 |

(Continued)

OTHER PUBLICATIONS

Chinese Office action issued in counterpart Chinese Application No. 201780056731.X dated May 7, 2021.
Columbian Office action issued in counterpart Columbian Application No. NC2019/0002561 dated Mar. 18, 2021.
Chilean Office action issued in counterpart Chilean Application No. 201901157 dated Dec. 14, 2020.
Chilean Office action issued in counterpart Chilean Application No. 201903719 dated Dec. 14, 2020.
Columbian Office action issued in counterpart Columbian Application No. NC2019/0002561 dated Dec. 1, 2020.

(Continued)

*Primary Examiner* — Sheeba Ahmed
(74) *Attorney, Agent, or Firm* — Marian E. Fundytus; Ostrolenk Faber LLP.

(57) ABSTRACT

Described herein are coatings which impart oil, grease, and water resistance to various materials, such as paper, paperboard and polymeric materials. Such coatings may be applied as barrier coatings to the substrate materials in order to inhibit and prevent the transmission of oil, grease and water; that is, to prevent oil, water grease from passing into and/or through the substrate material. The coatings include an acrylic-based polymer latex, a styrene-butadiene rubber latex, a styrene-acrylic resin solution, a large particle size wax, and optionally, a small particle size wax. Also disclosed herein is a process of preparing the coatings. Also disclosed are products to which the coatings have been applied in order to impart oil, grease and/or water resistance, and processes for preparing such products.

18 Claims, No Drawings

(56) References Cited

U.S. PATENT DOCUMENTS

| | | |
|---|---|---|
| 2015/0176210 A1 | 6/2015 | Jogikalmath et al. |
| 2016/0230343 A1 | 8/2016 | Pang et al. |

FOREIGN PATENT DOCUMENTS

| | | |
|---|---|---|
| CL | 59111 | 11/2017 |
| CN | 1500563 A | 6/2004 |
| CN | 101061273 A | 10/2007 |
| WO | WO 94/26513 A1 | 11/1994 |
| WO | WO 96/05054 A1 | 2/1996 |
| WO | WO 00/77300 A1 | 12/2000 |
| WO | WO 03/099548 A1 | 12/2003 |
| WO | WO 2007/050964 A1 | 5/2007 |
| WO | WO 2007/125312 A2 | 11/2007 |
| WO | WO 2010/141581 A1 | 12/2010 |
| WO | WO 2014/006269 A1 | 1/2014 |
| WO | WO 2014/028203 A1 | 2/2014 |
| WO | WO 2014/120175 A1 | 8/2014 |
| WO | WO 2014/130311 A1 | 8/2014 |
| WO | WO 2015/040134 A1 | 3/2015 |
| WO | WO 2015/171443 A1 | 11/2015 |

OTHER PUBLICATIONS

International Search Report issued in International Application No. PCT/US2017/59164, dated Jan. 9, 2018.
Written Opinion of the International Searching Authority issued in International Application No. PCT/US2017/59164, dated Jan. 9, 2018.
International Preliminary Report on Patentability issued in International Application No. PCT/US2017/059164, dated Apr. 30, 2019.
Aupplementzx EP Search Report issued in counterpart Application No. 17 86 5721, dated Apr. 29, 2020.
Chilean Office action issued in counterpart Chilean Application No. 201901157 dated May 12, 2020.

* cited by examiner

GREASE, OIL, AND WATER RESISTANT COATING COMPOSITIONS

The present application is a § 371 National Stage application based on PCT/US2017/59164 filed Oct. 31, 2017, which claims the benefit of U.S. Provisional Application No. 62/414,838 filed Oct. 31, 2016, the subject matter of each of which is incorporated by reference in their entirety.

FIELD OF THE INVENTION

The present disclosure and the inventions described herein are directed to the field of coatings, and in particular, to coatings that provide resistance to oil, grease, and water. Such coatings may be applied to packaging materials for, among other things, foods and beverages. The packaging materials may be formed from, by way of example, paper and paperboard products.

BACKGROUND OF THE INVENTION

Coatings that impart barrier properties are applied to paper and paperboard products to make such products useful for packaging food and other products. For example, there are coatings that provide resistance to the permeation of oil, water and grease into and through the packaging, which passage if not prevented could cause undesirable leaks and staining. Barrier properties are useful when, for example the packaged food product contains oil and/or grease, such as pizza or fried chicken.

Such coatings should also provide the substrate, e.g., the material used to make the packaging material, with a smooth and uniform surface finish. In some instances, the barrier coating should have other properties, such as be glueable and heat sealable, in order to close the packaging. Such coating compositions may include, for example, waxes, polymers, fluorocarbons and other components.

Barrier coatings applied to paper or paperboard, such as those based on waxes or polyethylene films, may be problematic during the repulping that takes place during recycling. Further, wax coatings cannot be readily glued or over-printed.

Fluorocarbon-based coatings have also been used to provide resistance to penetration by oil, grease and water, since fluorocarbons lower the surface energy of the substrate to which they are applied. However, the toxicity of fluorocarbons makes them undesirable for this use.

Coatings based on polymer emulsions have been used in food or beverage packaging, such food packages made from paper, plates, bowls, cups, containers, etc. Such coatings may be applied using conventional printing or coating techniques, both online and off-line, such as flexography, rotogravure, blade coating, curtain coating, rod (bar) coating or other suitable application methods. Therefore, such coatings must have good printability and runnability on press or coater to reach the desired level of consistency, durability, quality and productivity. Moreover, upon drying, the coating has to facilitate various converting processes, including transferring, die cutting, forming, etc.

Representative patent documents illustrating the field of barrier coated paper products include the following: U.S. Pat. Nos. 6,071,617, 6,307,192, 7,019,054, 7,282,273, 7,320,825, 7,427,444, 7,737,200, 8,440,262, 8,734,895, 8,734,959, 8,771,812, 8,771,835; U.S. Patent Appl. Publ. Nos. 2009/0252980, 2010/0136355, 2011/0027601, 2011/0262745, 2013/0004748, and 2013/0323368; Published international application nos. WO2007/050964, WO2014/028203, WO2014/130311, WO2015/040134, and WO2015/171443; and CA 2,323,341.

Polyvinyl alcohol (PVA) has been used in coatings to impart barrier properties. See for example U.S. Pat. Nos. 7,019,054, 7,282,273, 8,771,835, and WO 2007/050964. Styrene-butadiene-rubber (SBR) latex has been used in coatings to provide oil, grease and water resistance to a paper substrate. U.S. Pat. No. 8,734,895 discloses an oil and grease resistant coating containing an SBR latex (as a binder), a filler material and calcium carbonate. U.S. Publ. Patent Appl. No. 2010/0136355 discloses a coating composition for papers providing water vapor barrier properties, which comprises styrene-butadiene rubber (SBR) latex and 45-80% of talcum.

CA 2,323,341 discloses a paperboard container having enhanced grease resistance, which comprises a first functional coating of SBR. The coating is purported to be substantially free of clay coating.

Coatings including acrylic-based polymers have also been used to impart grease and water resistance to substrates. U.S. Publ. Patent Appl. No. 2009/0252980 discloses compositions and methods for rendering a substrate grease-resistant. The treatment composition contains one or more acrylic-based polymers, which can be either homo- or co-polymers including acrylate monomers. U.S. Publ. Patent Appl. No. 2011/0262745 discloses a method to provide coated paper or paperboard products with enhanced barrier properties. The coating compositions include an acrylic polymer emulsion and pigment.

Other water-based polymeric binders that have been used in water and grease-resistant coatings include polyesters, polyvinyl acetate, polyurethanes, and polyacrylic acid. For example, U.S. Pat. No. 7,427,444 discloses a paper coating composition comprising aqueous-based semi-crystalline vinyl acetate-ethylene (VAE) polymer emulsions containing crystalline ethylene segments, which coating is useful for imparting oil, grease, solvent, water, and moisture vapor resistance.

In addition to synthetic polymers, biopolymers are being developed for use in barrier compositions, such as egg white powder (U.S. Pat. No. 6,071,617), zein (U.S. Pat. No. 7,737,200), starch (U.S. Pat. No. 8,734,959, and international publication no. WO 2015/040134). However, commercial use is still limited due to higher cost and inadequate performance compared to the synthetic counterparts.

SUMMARY OF THE INVENTION

Described herein are inventive coatings which impart oil, grease and water resistance to substrate materials, such as paper, paperboard and polymeric materials, which can be formed into packaging materials for foods, beverages, and other products. Such coatings may be applied as barrier coatings to the materials in order to inhibit and prevent the transmission of oil, grease and water; that is, to prevent oil, water grease from passing into and/or through the coated material. Also disclosed herein is a process of preparing the coatings. Also disclosed are products to which the coatings have been applied in order to impart oil, grease and/or water resistance, and processes for preparing such products.

The coatings comprise:
an acrylic-based polymer latex;
a styrene-butadiene rubber (SBR) latex;
a styrene-acrylic resin solution;
a large particle size wax; and
optionally, a small particle size wax.

In one inventive aspect, the coatings are aqueous compositions, in which the latex components and the resin solution components are water-based. In another inventive aspect, additional water is included in the coatings.

In one particular aspect, the coatings described herein include, by weight, based on the total weight of the coating, an acrylic-based polymer latex in an amount of about 5 wt % to about 80 wt %, preferably about 10 wt % to about 60 wt %, and more preferably about 20 wt % to about 40 wt %; an SBR latex, in an amount of about 5 wt % to about 50 wt %, preferably about 10 wt % to about 40 wt %, and more preferably about 15 wt % to about 30 wt %; a styrene-acrylic resin solution, in an amount of about 5 wt % to about 80 wt %, preferably about 10 wt % to about 60 wt %, and more preferably about 20 wt % to about 40 wt %; a large particle size wax in an amount of about 0.5 wt % to about 8 wt %, preferably in an amount of about 1 wt % to about 6 wt %, and more preferably in an amount of about 2 wt % to about 4 wt %; and optionally, a small particle size wax in an amount of about 0.1 wt % to about 8 wt %, preferably in an amount of about 0.5 wt % to about 6 wt %, and more preferably in an amount of about 2 wt % to about 4 wt %.

In another inventive aspect, the coatings described herein are safe for contacting food and sensitive materials, and thus are applied to substrate materials formed into packaging for food and other sensitive materials. In one aspect, the coatings (1) do not contain toxic and/or harmful components; (2) do not contain components that can migrate into the food or sensitive materials, or (3) both. In one inventive aspect, the coatings are in compliance with government or trade association rules and regulations governing contact with food or other sensitive materials, such as the pertinent regulatory rules of the United States Food and Drug Administration ("FDA") and the Bundesinstitut für Risikobewertung (BfR) (translated as "German Federal Institute for Risk Assessment").

In one aspect of the inventions described herein, the components of the present coatings are non-volatile and are listed in the regulations for indirect food additives in Title 21 of the Code of Federal Regulations (CFR). In a more particular aspect of the inventions described herein, the components of the present coatings can be safely used as components of the uncoated or coated food-contact surface of paper and paperboard intended for use in producing, manufacturing, packaging, processing, preparing, treating, packing, transporting, or holding aqueous and fatty foods and dried foods, pursuant to, for example, 21 CFR §§ 176.170 and 176.180. See also BfR Recommendations XXXVI.

In another inventive aspect, the coatings described herein that provide oil, water, and grease resistance can be subjected to the recycling processes that the substrate materials/packaging materials are subjected to.

The substrates that may be coated with the coatings described herein may be paper, paperboard, polymeric substrates (e.g., polyolefins such as polyethylene and polypropylene), metals, wood, and any other substrate that can receive the coatings described herein. These substrates can be formed into articles such as packaging materials that are coated with the oil and grease resistant coatings described herein. Such coated articles and packaging materials are well suited to contain oily and greasy food products such as, for example, foods cooked in and/or coated with oily and greasy substances. This may include, for example, breakfast foods, salads, takeout (e.g., pizza), and ethnic dishes.

In addition to the aforenoted advantages provided by the present coatings, the coatings are free of volatile organic compounds (VOCs), are free of fluorocarbons, and also, compared to presently available commercial alternatives, provide better printability on the coated materials, have lower coefficients of friction (COF); exhibit lower foaming; and exhibit improved resistance to grease, oil, and water, thereby providing a more effective and desirable barrier coating. Further, it has been found that results comparable to those of commercially available coatings can be achieved at lower coating weights. Further, higher production speed can be used in the coating and printing processes, e.g., in the application of printing inks over the coatings.

It has been found that the coatings described herein consistently score better on the kit test when compared to coating products currently available from third party vendors. The kit test is a measure of the grease and oil resistance of a coated substrate. In one aspect, the improvement exhibited by the coatings described herein manifests itself as scoring comparably to a third party coating product, while attaining that score at a lower coating weight, that is, a coating weight less than that of the third party coating product. The kit test is described later in this disclosure.

The coatings of the present disclosure exhibit high oil and grease resistance (OGR) efficiency indexes. For example, the coatings have oil and grease resistance efficiency indexes that, as determined on the clay side of SUS board, are greater than 10.0, preferably greater than 10.1, more preferably greater than 11, even more preferably greater than 12, still even more preferably greater than 13, and yet even still more preferably greater than 14. OGR is described in more detail later in this disclosure.

DETAILED DESCRIPTION OF THE INVENTION

The coatings preferably comprise an acrylic-based polymer latex, an SBR latex, a styrene-acrylic solution and a wax with large particle size. Optionally, a small particle size wax may be included in the coatings. Other components, such as pigments, fillers, whiteners, etc. may be included in the coatings. A multilayer product that has enhanced barrier performance comprising one or more layers of the disclosed water-based coatings and one or more layers of a primer is also disclosed.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

Acrylic-Based Polymer Latex

Any acrylic-based polymer latex may be included in the coatings described herein. In one particular aspect, the coatings described herein include, by weight, based on the total weight of the coating, an acrylic-based polymer latex in an amount of about 5 wt % to about 80 wt %, preferably about 10 wt % to about 60 wt %, and more preferably about 20 wt % to about 40 wt %.

The acrylic-based polymer latex may include an acrylate homo- or co-polymer that is the polymerization product of one or more acrylate monomers, such as alkyl, aryl, alkaryl (meth)acrylates, esters of acrylic and methacrylic acid with alcohols which contain at least one further hetero atom in addition to the oxygen atom in the alcohol group and/or which contain an aliphatic or aromatic ring. Exemplary acrylate monomers include, for example, methyl methacrylate, methyl acrylate, n-butyl acrylate, ethyl acrylate, 2-ethylhexyl acrylate, 2-ethoxyethyl acrylate, 2-butoxyethyl (meth)acrylate, dimethylaminoethyl (meth)acrylate, diethylaminoethyl (meth)acrylate, cyclohexyl (meth)acrylate, phenylethyl (meth)acrylate, phenylpropyl (meth)acrylate, acrylates of heterocyclic alcohols, e.g., furfuryl (meth)acrylate, and combinations thereof. The acrylate homo- or co-polymers in the acrylic-based polymer latex may also include other polymerized monomers such as those having olefinic double bond(s) capable of undergoing free radical polymerization, including but not limited to vinyl esters, vinylaromatic compounds, nitriles, vinyl halides, hydrocarbons, and the like, such as vinyl laurate, vinyl stearate, vinyl propionate, vinyl acetate, vinyltoluene, α- and p-styrene, α-butylstyrene, 4-n-butylstyrene, 4-n-decylstyrene, styrene, chlorine-, fluorine- or bromine-substituted ethylenically unsaturated compounds, vinyl chloride, vinylidene chloride, butadiene, isoprene, chloroprene, and combinations thereof.

There are a number of commercially available acrylic-based polymer latex products suitable for inclusion in the coatings described herein. For food contact applications, products include, for example, Joncryl® DFC 3030, available from BASF, NeoCryl A-2092, available from DSM, and Texicryl 13-525, available from Scott Bader. For non-food contact applications, products include, for example, Texicryl 13-814, available from Scott Bader Neocryl A-1095, available from DSM, and Induprint SE 245, available from Indulor.

In some embodiments, the solids content of the acrylic-based polymer latex is about 30 wt % to about 70 wt %, preferably about 35 to about 65 wt %, and more preferably about 40 to about 60 wt %, based on the weight of the acrylic-based polymer latex.

The viscosity of the acrylic-based polymer latex is about 10 cP to about 3,000 cP, preferably about 100 cP to about 2,500 cP, and more preferably about 200 cP to about 2,000 cP.

The acid number of the acrylic-based polymer latex is about 10 to about 100, preferably about 30 to about 80, and more preferably about 40 to about 70.

In one particular aspect, the glass transition temperature (Tg) of the acrylic-based polymer latex is in the range of about −50° C. to about 50° C., preferably in the range of about −40° C. to about 40° C., and more preferably in the range of about −30° C. to about 30° C.

Styrene-Butadiene Rubber (SBR) Latex

Any SBR latex may be used in the coatings described herein. In one particular aspect, the SBR latex may be present in the coating, based on the total weight of the coating, in an amount of about 5 wt % to about 50 wt %, preferably about 10 wt % to about 40 wt %, and more preferably about 15 wt % to about 30 wt %.

In one particular aspect, the SBR latex has a solids content of about 30 wt % to about 70 wt %, preferably about 35 wt % to about 65 wt %, and more preferably about 40 wt % to about 60 wt %, based on the weight of the SBR latex.

In one particular aspect, the SBR latex has a viscosity of about 10 cP to about 2,000 cP, preferably about 50 cP to about 1,500 cP, and more preferably about 100 cP to about 1,000 cP.

In one particular aspect, the SBR latex has a glass transition temperature of about −30° C. to about 30° C., preferably about −20° C. to about 20° C., and more preferably about −10° C. to about 10° C.

In one particular aspect, the solid particles in the SBR latex have a particle diameter ≤about 1.0 micron, preferably ≤about 0.5 micron, and more preferably ≤about 0.3 micron.

There are a number of commercially available SBR latex products suitable for inclusion in the coatings described herein. For food contact applications, products include, for example, GenFlo 3003, available from Omnova Solutions, Tykote 1019, available from Mallard Creek, and Savinex 98F10, available from Synthetic Latex Company. For non-food contact applications, products include, for example, Rovene 4009, available from Mallard Creek, and ENCOR DL 313 4009, available from Arkema.

Styrene-Acrylic Resin Solution

Any styrene-acrylic resin in solution can be used as the styrene-acrylic resin solution component of the coatings described herein. In one particular aspect, styrene-acrylic resin solution is present in the coating, based on the coating weight, in an amount of about 5 wt % to about 80 wt %, preferably about 10 wt % to about 60 wt %, and more preferably about 20 wt % to about 40 wt %.

In one aspect, the styrene-acrylic resin solution includes a polymerization product of styrene and an acrylate monomer such as, for example, methyl acrylate, ethyl acrylate, methyl methacrylate, ethyl methacrylate, butyl acrylate, 2-ethylhexyl acrylate, the acids of these acrylates, and combinations of the acrylates, and combinations including the acids thereof.

In one aspect, the styrene-acrylic resin solution has a solids content of about 10 wt % to about 60 wt %, preferably about 20 wt % to about 50 wt %, and more preferably about 30 wt % to about 40 wt %, based on the weight of the styrene-acrylic resin solution.

In one aspect, the viscosity of the styrene-acrylic resin solution is about 100 cP to about 50,000 cP, preferably about 500 cP to about 10,000 cP, and more preferably about 1,000 cP to about 5,000 cP.

In one aspect, the Tg of the styrene-acrylic resin solution is about 0° C. to about 200° C., preferably about 25° C. to about 150° C., and more preferably about 50° C. to about 100° C.

The acid number of the acrylic-based polymer resin is about 50 to about 500, preferably about 100 to about 400, and more preferably about 150 to about 300.

There are a number of commercially available styrene-acrylic resin solution products suitable for inclusion in the coatings described herein. For food contact applications, products include, for example, Joncryl® DFC 3025 and Joncryl® ECO 75, both available from BASF. For non-food contact applications, products include, for example, Joncryl® 60 (BASF), Texicryl S-0245 (Scott Bader), and Induprint S 1033 (Indulor).

Large Particle Size Wax

A preferred large particle size wax that can be used in the coatings described herein is any polyethylene wax, as a powder or an aqueous dispersion thereof, in which the particle size mean value, as measured by laser diffraction, is about 3 microns to about 30 microns, preferably about 6 microns to about 20 microns, and more preferably about 9 microns to about 15 microns.

The large particle wax may be present in the coatings of the present disclosure, based on the weight of the coatings, in an amount of about 0.5 wt % to about 8 wt %, and preferably in an amount of about 1 wt % to about 6 wt %, and more preferably in an amount of about 2 wt % to about 4 wt %.

There are a number of commercially available wax products suitable for inclusion in the coatings described herein as the large particle size wax. For food contact applications, products include, for example, Hydrocer 357, available from Shamrock Technologies, and Microspersion 22-50, available from Micro Powders. For non-food contact applications, products include, for example, Jonwax 4 (BASF), Luba-print WX9825, available from Munzing and Microspersion 215-50 (Micro Powders).

Small Particle Size Wax

The small particle size wax may be present in the coatings described herein, based on the weight of the coating, in an amount of about 0.1 wt % to about 8 wt %, preferably in an amount of about 0.5 wt % to about 6 wt %, and more preferably in an amount of about 2 wt % to about 4 wt %. Preferred small particle size waxes that can be used in the coatings described herein are polyethylene, paraffin waxes, and mixtures thereof, in which the particle size mean value measure by laser diffraction is about 0.01 micron to about 1 micron, preferably about 0.01 micron to about 0.5 micron, and more preferably about 0.01 micron to about 0.1 micron.

There are a number of commercially available wax products suitable for inclusion in the coatings described herein as the small particle size wax. For food contact applications, products include, for example, Jonwax 120, available from Shamrock Technologies; Astro HDPE 35FG, available from Astro American Chemical Co., Inc., Jonwax 28 (BASF), Aquacer 497 (BYK) and Ultralube E-842N (Keim Additec). For non-food contact applications, products include, for example, Jonwax 26 (BASF), Aquacer 533 (BYK) and Astro HDPE-35 (Astro American Chemical Co., Inc.).

Crosslinking Agents

In one aspect, a crosslinking agent such as ammonium zinc carbonate, ammonium zirconium carbonate, and mixtures thereof can be included in the coatings described herein. The inclusion of the crosslinking agent may further improve or enhance the resistance properties of the coatings, and in particular it may improve resistance when the coatings and/or articles coated with same are exposed to high temperature conditions. The amount of crosslinking agent included in the coatings may be, based on the coatings, about 0.1 wt % to about 15 wt %, preferably about 0.5 wt % to about 10 wt %, and more preferably, about 1 wt % to about 5 wt %. Higher amounts may compromise the recyclability and repulpability of the paper. Suitable crosslinking agents include Zinc Oxide solution #1 (ammonium zinc carbonate solution, available from BASF) and Bacote 20 (ammonium zirconium carbonate solution, available from MEL Chemicals).

Fillers and Additives

Any known and conventional filler material may be included in the coatings described herein. Suitable fillers include, for example, talc, clay, alumina, silica, titanium dioxide, sodium hexametaphosphate, calcium carbonate and mixtures thereof. Other materials may be used. In one aspect, the amount of filler materials present, based on the total weight of the coatings, is about 0 wt % to about 50 wt %, preferably about 5 wt % to about 40 wt %, and more preferably about 10 wt % to about 30 wt %, based on the dry weight of the coating.

Additives that may be included in the coatings described herein, such as, for example, defoamers, wetting agents, leveling agents, colloidal stabilizers, rheology modifiers, biocides, pesticides, surfactants, adhesion promoters, silicones, light stabilizers, de-gassing additives, waxes, ammonia, flow promoters, defoamers, antioxidants, stabilizers, dispersants, plasticizers, rheological additives, and others, and combinations thereof. In addition, other additives can be added to the coatings of the present invention in order to enhance the usefulness of the coatings or the coatings produced by curing the coatings. For example, plasticizers, antimicrobials, coloring agents, optical brighteners, ultraviolet absorbers, antioxidant, and the like can be incorporated into the coatings of the present invention, if desired. The amount of additives that may be included in the coatings may be, based on the total weight of the coating, about 0.05 wt % to about 5 wt %.

Colorants may be included in the coatings described herein. Suitable colorants include, but are not limited to, organic or inorganic pigments and dyes known to the person of ordinary skill in the art. Suitable dyes include, for example, fluorescent dyes, azo dyes, anthraquinone dyes, xanthene dyes, azine dyes, and combinations thereof. Organic pigments may be one pigment or a combination of pigments, such as for instance Pigment Yellow Numbers 12, 13, 14, 17, 74, 83, 114, 126, 127, 174, 188; Pigment Red Numbers 2, 22, 23, 48:1, 48:2, 52, 52:1, 53, 57:1, 112, 122, 166, 170, 184, 202, 266, 269; Pigment Orange Numbers 5, 16, 34, 36; Pigment Blue Numbers 15, 15:3, 15:4; Pigment Violet Numbers 3, 23, 27; and/or Pigment Green Number 7.

Suitable inorganic pigments that may be included in the coatings are, for example: iron oxides, titanium dioxides, chromium oxides, ferric ammonium ferrocyanides, ferric oxide blacks, Pigment Black Number 7 and/or Pigment White Numbers 6 and 7. Other organic and inorganic pigments and dyes can also be employed, as well as combinations that achieve the desired colors.

In one aspect, the coatings described herein have a viscosity of about 10 cP to about 1,000 cP, preferably about 50 cP to about 800 cP, and more preferably about 100 cP to about 500 cP.

Additional water may be added to the present coatings. In one aspect, water is added to adjust the viscosity of the coatings.

The solids content of the coatings, based on the weight of the coatings, is about 30 wt % to about 70 wt %, preferably about 35 to about 60 wt %, and more preferably about 40 to about 50 wt %.

Water miscible organic solvents may be included in the coatings. If so, they may be present in amounts of about 0.1 wt % to about 10 wt %, based on the total weight of the coatings. Examples include, but are not limited to, ethanol, isopropanol, N-propanol, glycols, glycol ethers and the like.

The coatings of the present disclosure may be prepared by blending the acrylic-based polymer latex component, the SBR latex component, and the styrene-acrylic resin component, followed by adding to the blend the large particle size wax, the optional small particle size wax and other optional inclusions, such as the fillers, cross-linkers and other additives and carrying out further mixing. In one preferred aspect, a defoamer component is the added after adding the acrylic-based polymer latex component, in order to fully disperse the defoamer and minimize foam formation. If the viscosity of the coatings should be adjusted, then water can be added in an amount sufficient to adjust the viscosity to the desired value An article comprising a substrate on which the coating described herein has been applied is imparted with oil, grease, and water resistance, e.g., the coated substrate is impermeable to the passage of oil, grease, and/or water due to the presence of the applied coating described herein.

Among the substrates that are suitable to receive the coatings include, for example, paper, paperboard, polymeric substrates (e.g., polyolefins such as polyethylene and polypropylene), metal, wood, and any other substrate that can receive the coatings described herein. The coated materials may be formed into printed articles exhibiting resistance to the impermeability of oil, water, and grease. Such articles may be, for example, plates, cups, and containers suited for holding food. In one aspect, at least the food-contact side of the substrate of the article is coated with the coatings described herein, which are in compliance with government or trade association regulations, such as compliance with the pertinent regulatory rules of the United States Food and Drug Administration ("FDA"), such as for example, 21 CFR §§ 176.170 and 176.180, and BfR Recommendations XXXVI.

In another aspect, the articles coated with the coatings described herein are recyclable.

In one aspect of the present disclosure, the printed articles comprise a substrate on which multiple coating layers are applied. In a multilayer arrangement of this kind, one or more layers of the coatings are applied to the substrate and one or more layers of another coating composition, such as a primer composition or an overprint varnish layer, are applied. The layers may be applied in any order, e.g., a primer layer may be applied to the substrate, the oil, water, and grease resistant coating may next be applied, and then an overprint varnish layer may be applied. With such arrangements, further enhancements in the properties may be realized through the combinations of applied coating layers. Improved substrate bonding and or resistance to removal of the coatings may be realized. Improved barrier performance, e.g., resistance to the passage of grease, water, and oil, may also be realized.

The coatings described herein may be applied to substrate materials by known printing methods and other application methods. For example, the coatings may be applied to substrates by printing techniques such as flexography ("flexo"), gravure, lithography, offset, and screen printing; and can be applied by other methods such as, for example, roller coating, rod coating, roll metering, blade coating, comma coating, spray coating, screen coating, and rotary screen coating. The skilled artisan is capable of adjusting parameters, such as viscosity and solids content, for each such application technique. Substrates may be paper or paperboard, and in one aspect, the application is by a printing employing a flexographic or gravure printing press.

In other embodiments, the coatings are applied to a substrate such as paper or paperboard by a coating machine having a bend blade, an air knife, a rod coater, or a curtain coater.

In one embodiment, printing inks are printed over the coatings after the coatings are cured, e.g., after the coatings are heated to dry them and evaporate water (and solvent, if any) contained in the coating.

In one embodiment, the coating is applied over the top of the inks printed on the paper or paperboard.

In certain embodiments, the cured coatings form a strong bond with the paper or paperboard substrate with application of a glue.

In certain embodiments, the cured coatings form a strong bond with themselves via a heat sealing process.

Examples

The following examples illustrate specific aspects of the present invention and are not intended to limit the scope thereof in any respect and should not be so construed.

In the Examples described herein, the coatings are applied to the clay side of 14 pt SUS (solid unbleached sulfate) board made by Graphic Packaging International (GPI). In particular, the SUS board is clay coated Omni-Kote® Folding Cartonboard. This product meets FDA requirements for food packaging. The board has the following properties: Caliper: 14 pt; Thickness: 356 microns; grammage: 303 gsm; Taber Stiffness: 15.2 mN·m (machine direction), 7.8 mN·m (cross direction); GE Brightness: 80. %; Moisture: 7. Kit values and OGR, among other coating properties, are determined for coatings applied to this board.

Application is made by a 5 billon cubic microns (BCM) KLOX hand proofer. When applied to other paper or paperboard substrates by other methods, the person of ordinary skill in the art would understand how to adjust the formulations for viscosity, rheology, etc. in order to suit the chosen application method (e.g. flexographic printing, gravure printing, blade coating, curtain coating, rod/bar coating).

The solids content of the coatings was determined based on the weight difference of the coatings before and after evaporating water and other volatile material. Evaporation was effected by heating one gram of the coating at 150° C. for 30 minutes.

Viscosity was measured by a Brookfield DV-2T viscometer with spindle LV-2(62) at 30 rpm, at approximately 25° C.

In the aeration test in which foam volume is determined, 70 mL of coating was placed in a graduated cylinder and purged with air through tubing with a fritted glass tip at 100 mL/min for 5 minutes. The foam volume was recorded after stopping the purge.

The TAPPI T 559 test method, a/k/a the kit test, was employed to measure the grease and oil resistance of the coatings. The test involves releasing a drop of a mixture of castor oil, heptane, and toluene onto a coated substrate, and observing, after 15 seconds, whether the coated substrate has darkened. Twelve different mixtures in all were applied. Based on the aggressiveness of the mixtures, the mixtures were numbered 1-12, with mixture 12 being the most aggressive and mixture 1 being the least aggressive. The less castor oil in the mixture, the more aggressive the mixture. Failure is indicated by the darkening or discoloring of the coated substrate, which occurs when at least a portion of the test mixture is absorbed by the substrate. The sample score is the highest numbered mixture (nos. 1-12) applied without failure. This is the "kit level". In the present disclosure, the clay side of SUS board was employed as the coated substrate.

The gluing strength was measured by adhering the coating to the substrate by a regular laminating adhesive. An Instron tensiometer (Model 3342) is used to measure the force required to break the 1 inch wide laminated sample at a pulling speed of 10 inch/min. The results are expressed in gf/inch (gram force/inch). In the present case, paper tear would be observed when the gluing strength was above 500 gf/inch while the coating will delaminate from the substrate if the gluing strength is below 500 gf/inch.

The heat seal strength was measured by heat sealing the coating to coating at 200° C. and 40 psi for 0.4 sec to create a 1 inch wide seal. An Instron tensiometer (Model 3342) is used to measure the force required to break the 1 inch wide heat sealed sample at a pulling speed of 10 inch/min. The results are expressed in gf/inch. In the present case, a paper tear is observed when the gluing strength is above 500 gf/inch, indicating that the substrate failed before the coating, which is a favorable result. Delamination of the coating would be observed when the gluing strength is below 500 gf/inch. The higher the gf/inch, reading, the better the heat seal strength.

Coefficient of friction (COF), including both static COF and kinetic COF, was measured on the coated side against the coated side according to ASTM D1894 using a Slip and Friction Tester (Testing Machines, Inc., Model 32-07) at room temperature. B-sled (200 g) was used, and the travel distance was 8 cm at a speed of 15 cm/min. The static time was set at 1,200 ms. A lower COF value is advantageous.

TAPPI T 441 test method was employed to measure the water absorptiveness of the coated substrate by a Cobb Sizing Tester (Testing Machines, Inc., Model 61-04). The water absorptiveness (Cobb value) is defined as the mass of water absorbed in a specific time by 1 m² of paper, board, or corrugated fiberboard under 1 cm of water. The standard test time is 120 seconds.

Resolubility time, which is the amount of time required to resolubilize a coating that has dried on the printing cylinder, is determined on a Geiger Gravure Proofing Press (Geiger Tool & Manufacturing Co., Inc.). In the resolubility test, the coating is applied to substrates using the Geiger Press and then the press is stopped for 15 minutes. Running of the press is resumed at a speed of 50 RPM for different periods of time. Prints are made after 1 minute, 5 minutes, 10 minutes, and 15 minutes, respectively. The resolubility test is passed if the lay of the coating on the print is observed to be uniform and does not contain any observable gaps. The time needed to pass the resolubility test is recorded.

Theoretical dry coat weight calculations are based on the theoretical transfer rate of different printing/coating techniques and the solids content of the coatings. For example, assuming an even split in each transfer, the theoretical wet coat weight (grams per square meter (gsm)) is equal to about 1.55 times 25% of anilox volume (bcm) by flexography, and about 1.55 times 50% of anilox volume (bcm) by rotogravure. The dry coat weight is the solids content of the coating multiplied by the wet coat weight.

The oil and grease resistance efficiency index (OGR) is the ratio of the kit level of a coating to the theoretical dry coat weight (gsm). Higher OGR values are desired, as they are indicative of an effective and efficient coating having high coating resistance per applied coating weight. A high OGR value indicates that a coating provides highly effective resistance to oil and grease at a relatively lower amount of applied coating weight, making it possible to coat more substrate with a given amount of coating, while achieving highly effective grease and oil resistance. High OGR coatings increase efficiency and productivity.

The OGR efficiency index was determined on the clay side of SUS board, which board is described above.

The coatings of Inventive Examples 1-3 and Comparative Examples 4-9 are reported in Tables 1 and 2. The coatings are based on a preferred aspect in which the components of the coatings and thus the coatings themselves are acceptable for food contact pursuant to 21 CFR§ 176.170 and 21 CFR§ 176.180. It is understood that the coatings of the examples may also be used for non-food contact applications. Also, components that are not in compliance with the above regulations can be used inventive coatings suited for non-food contact applications.

TABLE 1

Coatings and Properties for Inventive Examples 1-3

| Components | Description | Ex. 1 (Inv.) | Ex. 2 (Inv.) | Ex. 3 (Inv.) |
| --- | --- | --- | --- | --- |
| Joncryl DFC 3030 | Acrylic-based polymer latex | 26.97 | 26.60 | 26.03 |
| Genflo 3003 | Styrene-butadiene rubber (SBR) latex | 19.70 | 19.70 | 19.70 |
| Joncryl DFC 3025 | Styrene-acrylic solution | 40.74 | 39.89 | 39.05 |
| DEE-FO PI-40 | Defoamer | 0.36 | 0.60 | 0.36 |
| BYK-016 | Defoamer | 0.19 | | 0.19 |
| Water | Diluent | 6.87 | 6.82 | 6.28 |
| Hydrocer 357 | Large particle size was | 2.40 | 4.00 | 0.10 |
| Jonwax 120 | Small particle size wax | 0.38 | | |
| HDPE 35FG | Small particle size wax | | | 5.90 |
| HydroPalat WE 3475 | Wetting agent | 0.49 | 0.49 | 0.49 |
| Ammonium Hydroxide (5.9%) | pH stabilizer | 1.32 | 1.32 | 1.32 |
| Zinc Oxide Solution #1 | Cross-linker | 0.58 | 0.58 | 0.58 |
| Total | | 100.00 | 100.00 | 100.00 |
| Solids content (%) | | 40 | 40 | 40 |
| Viscosity (cP) | | 100 | 96 | 94 |
| Kit Level | | 11 | 11 | 11 |
| Gluing Strength (gf/in) | | >500 | >500 | >500 |
| Static COF | | 0.27 | 0.32 | 0.42 |
| Kinetic COF | | 0.23 | 0.23 | 0.36 |
| Foam Volume (mL) | | 6 | 10 | 14 |
| Resolubility Time (min) | | 1 | 1 | 1 |
| Theoretical dry coat weight (gsm) | | 0.78 | 0.78 | 0.78 |
| OGR Efficiency Index | | 14.1 | 14.1 | 14.1 |

TABLE 2

Coatings and Properties for Comparative Examples 4-9

| Components | Description | Ex. 4 (Comp.) | Ex. 5 (Comp.) | Ex. 6 (Comp.) | Ex. 7 (Comp.) | Ex. 8 (Comp.) | Ex. 9 (Comp.) |
| --- | --- | --- | --- | --- | --- | --- | --- |
| Joncryl DFC 3030 | Acrylic-based polymer latex | 33.71 | 67.42 | | | 51.97 | 49.07 |
| Genflo 3003 | Styrene-butadiene rubber (SBR) latex | 19.26 | 19.26 | 19.26 | 51.97 | | 35.61 |

TABLE 2-continued

Coatings and Properties for Comparative Examples 4-9

| Components | Description | Ex. 4 (Comp.) | Ex. 5 (Comp.) | Ex. 6 (Comp.) | Ex. 7 (Comp.) | Ex. 8 (Comp.) | Ex. 9 (Comp.) |
|---|---|---|---|---|---|---|---|
| Joncryl DFC 3025 | Styrene-acrylic solution | 33.71 | | 67.42 | 32.71 | 32.71 | |
| BYK-016 | Defoamer | 0.48 | 0.48 | 0.48 | 0.48 | 0.48 | 0.48 |
| Water | Diluent | 9.96 | 9.96 | 9.96 | 9.96 | 9.96 | 9.96 |
| Hydrocer 357 | Large particle size wax | | | | 2 | 2 | 2 |
| Jonwax 120 | Small particle size wax | 0.96 | 0.96 | 0.96 | 0.96 | 0.96 | 0.96 |
| BYK-3410 | Wetting agent | 0.48 | 0.48 | 0.48 | 0.48 | 0.48 | 0.48 |
| Zinc Oxide Solution #1 | Cross-linker | 1.44 | 1.44 | 1.44 | 1.44 | 1.44 | 1.44 |
| Total | | 100.00 | 100.00 | 100.00 | 100.00 | 100.00 | 100.00 |
| Solids content (%) | | 40 | 44 | 36 | 39 | 37 | 42 |
| Viscosity (cP) | | 93 | 140 | 203 | 319 | 72 | 76 |
| Kit Level | | 7 | 6 | 7 | 7 | 5 | 4 |
| Gluing Strength (gf/in) | | >500 | >500 | 358 | >500 | >500 | >500 |
| Static COF | | 0.71 | 0.61 | 0.35 | 0.39 | 0.26 | 0.45 |
| Kinetic COF | | 0.55 | 0.54 | 0.33 | 0.27 | 0.20 | 0.37 |
| Foam Volume (mL) | | 11 | 10 | >180 | >180 | 164 | 11 |
| Resolubility Time (min) | | 1 | >15 | 10 | 1 | 5 | 15 |
| Theoretical dry coat weight (gsm) | | 0.78 | 0.85 | 0.70 | 0.76 | 0.72 | 0.81 |
| OGR Efficiency Index | | 9.0 | 7.1 | 10.0 | 9.2 | 6.9 | 4.9 |

As shown in Tables 1 and 2, Inventive Examples 1-3 and Comparative Examples 4-9 have similar solids contents, viscosities and coating weights (all of the examples were printed the clay side of the SUS board using the same anilox, creating similar coating weight for all examples). However, Inventive Examples 1-3 exhibit superior oil and grease resistance (higher kit level) when compared to Comparative Examples 4-9, which lack at least one of the acrylic-based polymer latex component, the SBR latex component, the styrene-acrylic resin solution component, and the large particle size wax component. Further, Inventive Examples 1-3 exhibit superior OGR values when compared to Comparative Examples 4-9. The coatings of Examples 1-3 and Comparative Examples 4-9 are FDA compliant for contact with food, thus the printed articles may be made into FDA-compliant food packaging materials.

Comparative Examples 4-5 do not include the large particle size wax. These comparative examples exhibit a much higher COF than Inventive Examples 1-3, which include the large particle size wax. Lower COF and/or lower slide angle is one of the indications of good printability and runnability on a press or a coater machine. The speed of various converting processes is increased, such as the processes of transferring, die cutting, forming, etc. Thus, productivity is improved.

Inventive Example 1 exhibits excellent gluing strength, while Comparative Example 6 fails the gluing test. This demonstrates that coatings that include an acrylic-based polymer latex, an SBR latex and a styrene-acrylic resin solution exhibit better oil and grease resistance and good gluing strength. Large particle size wax is included to lower the COF of the coating.

Comparative Examples 7-9 respectively do not include the acrylic-based polymer latex component, SBR latex component, and styrene-acrylic solution component. In addition to exhibiting inferior Kit level values, Comparative Examples 7-9 contain much more foam and/or require longer resolubility time than Inventive Examples 1-3. Less foaming and shorter resolubility time are desired because the number of printing defects is reduced. Such defects may occur at high printing speed. Production down time is thus reduced with the inventive coatings.

The inventive coatings of the examples in Table 1 use materials suitable for food contact in compliance with FDA Regulation 21 CFR§ 176.170 and 21 CFR§ 176.180. It is understood that the Inventive Examples 1-3 could also be used for non-food contact applications. It is also understood that materials that do not meet the FDA food contact regulation could be chosen to provide inventive coatings that would be used for applications that are not intended for food contact.

Tables 1 and 2 show that the coatings of the inventive examples which include each of an acrylic-based polymer latex, an SBR latex, styrene-acrylic resin solution, and a large particle size wax perform much better than the comparative examples, which do not include all of these components. When one or more of the materials is removed, some or all of the properties of the coatings are compromised.

Table 3 reports physical properties of components used in Inventive Examples 1-3 and Comparative Examples 4-9.

TABLE 3

Physical Properties of Components Used in Formulating Inventive Examples 1-3 and Comparative Examples 4-9

| | Solids content (%) | Viscosity (cP) | Tg (° C.) | Acid Number | Average Particle Size (μm) |
|---|---|---|---|---|---|
| Joncryl DFC 3030 | 46.5-48.0 | 500-1,800 | −27 | 64 | N/A |

TABLE 3-continued

Physical Properties of Components Used in
Formulating Inventive Examples 1-3 and Comparative Examples 4-9

| | Solids content (%) | Viscosity (cP) | Tg (° C.) | Acid Number | Average Particle Size (μm) |
|---|---|---|---|---|---|
| GenFlo 3003 | 50 | <160 | −5 | N/A | <0.2 |
| Joncryl DFC 3025 | 33.0-35.4 | 1,800-5,500 | 95 | 220 | N/A |
| Hydrocer 357 | 47-53 | 1,000-4,000 | N/A | N/A | ~10 |
| Jonwax 120 | 33-35 | 100-700 | N/A | N/A | 0.08 |
| HDPE 35FG | 35 | <50 | N/A | N/A | <1.0 |

Table 4 shows the results of a comparison between Examples 1-3 and competitor's products denoted as Comparative Examples 10-13. Example 1 has less foam, a lower COF, higher kit level (indicating superior resistance to oil and grease), and comparable Cobb value in relation to all of the competitor's products. Example 1 and Comparative Examples 10-13 are all applied at comparable coating weight. The low Cobb value of the substrate coated with Example 1 evidences excellent water resistance properties and effectiveness at providing a barrier to the passage of water.

TABLE 4

Comparison Between Example 1 and Competitor's Products (Comparative Examples 10-13)

| | Inv. Ex. 1 | Inv. Ex. 2 | Inv. Ex. 3 | [1]Comp. Ex. 10 | [2]Comp. Ex. 11 | [3]Comp. Ex. 12 | [4]Comp. Ex. 13 |
|---|---|---|---|---|---|---|---|
| Solids content (%) | 40 | 40 | 40 | 44 | 36 | 39 | 46 |
| Viscosity (cP) | 100 | 96 | 94 | 115 | 98 | 98 | 470 |
| Aeration Foam Volume (mL) | 6 | 10 | 14 | 34 | 15 | >180 | >180 |
| Static COF | 0.27 | 0.32 | 0.42 | 0.82 | 0.47 | 0.52 | 0.84 |
| Kinetic COF | 0.23 | 0.23 | 0.36 | 0.43 | 0.40 | 0.36 | 0.66 |
| Kit Level | 11 | 11 | 11 | 6 | 10 | 11 | 8 |
| Cobb Value (g/m$^2$) | 13.0 | 30.3 | 29.3 | 15.9 | 14.2 | 9.3 | 30.4 |
| OGR (gsm) | 14.1 | 14.1 | 14.1 | 7.1 | 14.3 | 14.5 | 9.0 |

[1]C&A 1855DE (Coatings & Adhesives Corp.)
[2]CK-7451-HV (Cork Industries)
[3]62316 (ICI)
[4]Barrier-Grip 9471A (Enviro Coatings)

Using the rotogravure printing technique, the coatings of Example 1 and C&A 1855DE (Comp. Ex. 10) were applied at the anilox volumes set forth in Table 5 to the clay side of SUS board. As shown, the coating of inventive Example 1 imparts oil and grease resistance comparable to that of the competitor's product of Comparative Example 10, yet achieves this resistance at a lower coating weight. Thus, the OGR value of the Example 1 coating is considerably superior to the C&A 1855DE coating. Some of the advantages of being able to apply coatings at lower coat weights include faster print capability, faster drying, energy savings, improved recyclability, reduced waste (lower environmental impact), etc.

TABLE 5

Kit Test Results of Example 1 and a Competitor's Commercial Product

| Sample | Kit Level | Anilox Volume (BCM) | Theoretical dry coat weight (gsm) | OGR Efficiency Index |
|---|---|---|---|---|
| Inv. Example 1 | 11 | 2.5 | 0.78 | 14.1 |
| Comp. Example 10 | 6 | 2.5 | 0.85 | 7.1 |

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed is:

1. A coating composition, comprising:
   (a) 10 wt % to 60 wt % of an acrylic-based polymer latex, based on the total weight of the coating composition; wherein the acrylic-based polymer latex has a solids content of 30 wt % to 70 wt %;
   (b) 10 wt % to 40 wt % of a styrene-butadiene rubber latex, based on the total weight of the coating composition; wherein the styrene-butadiene rubber latex has a solids content of 30 wt % to 70 wt %;
   c) 10 wt % to 60 wt % of a styrene-acrylic resin solution, based on the total weight of the coating composition; wherein the styrene-acrylic resin solution has a solids content of 10 wt % to 60 wt %; and
   (d) a large particle size wax having a particle size of about 3 microns to about 30 microns;
   wherein the coating composition contains less than 40 wt % calcium carbonate, based on the total weight of the coating composition.

2. The coating of claim 1, further comprising a small particle size wax having a particle size of about 0.01 micron to about 1.0 micron.

3. The coating of claim 1, wherein the large particle size wax is present in the coating in an amount of about 0.5 wt % to about 8 wt %.

4. The coating of claim 2, wherein the small particle size wax is present in the coating in an amount of about 0.1 wt % to about 8 wt %.

5. The coating of claim 1, wherein the acrylic-based polymer latex comprises the polymerization product of monomers selected from methyl methacrylate, methyl acrylate, n-butyl acrylate, ethyl acrylate and 2-ethylhexyl acrylate, 2-ethoxyethyl acrylate, 2-butoxyethyl (meth)acrylate, dimethylaminoethyl (meth)acrylate, diethylaminoethyl (meth)acrylate, cyclohexyl (meth)acrylate, phenyl ethyl (meth)acrylate, phenylpropyl(meth)acrylate, acrylates of heterocyclic alcohols, or combinations thereof.

6. The coating of claim 1, wherein the large size particle wax comprises a polyethylene wax.

7. The coating of claim 1, wherein the large size particle wax has a particle size of about 6 microns to about 20 microns.

8. The coating of claim 1, wherein the small size particle wax comprises a wax selected from a polyethylene wax, a paraffin wax, or mixtures thereof.

9. The coating of claim 1, wherein the small size particle wax has a particle size of about 0.01 micron to about 0.1 micron.

10. The coating of claim 1, further comprising a cross-linker selected from ammonium zinc carbonate, ammonium zirconium carbonate, and or combinations thereof.

11. The coating of claim 1, further comprising an additive, a colorant, or both.

12. A printed article exhibiting resistance to oil, water and grease comprising:
    a substrate: and
    the coating of claim 1 printed on or over the substrate.

13. The printed article of claim 12, wherein the substrate is a material selected from paper, paperboard, polymers, metals, or wood.

14. The printed article of claim 12, wherein the printed article further comprises a printed layer selected from a primer layer or overprint varnish layer.

15. The printed article of claim 12, further comprising a printed layer of ink.

16. The coating of claim 1, wherein the coating has an oil and grease resistance efficiency index that, as determined on the clay side of SUS board, is greater than 10.0.

17. The printed article of claim 12, wherein the coating has an oil and grease resistance efficiency index that, as determined on the clay side of SUS board, is greater than 10.0.

18. A coating composition, comprising:
    (a) 20 wt % to 40 wt % of an acrylic-based polymer latex, based on the total weight of the coating composition; wherein the acrylic-based polymer latex has a solids content of 40 wt % to 60 wt %;
    (b) 15 wt % to 30 wt % of a styrene-butadiene rubber latex, based on the total weight of the coating composition; wherein the styrene-butadiene rubber latex has a solids content of 40 wt % to 60 wt %;
    c) 10 wt % to 60 wt % of a styrene-acrylic resin solution, based on the total weight of the coating composition; wherein the styrene-acrylic resin solution has a solids content of 30 wt % to 40 wt %; and
    (d) a large particle size wax having a particle size of about 3 microns to about 30 microns;
    wherein the coating composition contains less than 30 wt% calcium carbonate, based on the total weight of the coating composition.

* * * * *